(12) United States Patent
Hirata

(10) Patent No.: US 7,416,584 B2
(45) Date of Patent: Aug. 26, 2008

(54) FUEL VAPOR ADSORPTION FILTERS

(75) Inventor: Ryu Hirata, Kariya (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 364 days.

(21) Appl. No.: 11/158,310

(22) Filed: Jun. 21, 2005

(65) Prior Publication Data

US 2005/0279210 A1 Dec. 22, 2005

(30) Foreign Application Priority Data

Jun. 21, 2004 (JP) ............................... 2004-182617

(51) Int. Cl.
*B01D 53/02* (2006.01)
*F02M 35/024* (2006.01)

(52) U.S. Cl. .................. 96/135; 96/154; 55/DIG. 5

(58) Field of Classification Search .................. 96/134, 96/135, 147, 153, 154; 55/385.3, 511, 527, 55/DIG. 5, DIG. 31; 123/518, 198 E; 442/417; 427/202, 244
See application file for complete search history.

(56) References Cited

U.S. PATENT DOCUMENTS

| 4,418,662 | A | * | 12/1983 | Engler et al. | .................. 96/133 |
|---|---|---|---|---|---|
| 4,433,024 | A | * | 2/1984 | Eian | ............................ 428/198 |
| 4,604,313 | A | * | 8/1986 | McFarland et al. | .......... 428/172 |
| 5,486,410 | A | * | 1/1996 | Groeger et al. | .............. 442/353 |
| 5,690,719 | A | * | 11/1997 | Hodge | ............................ 96/17 |
| 5,980,616 | A | * | 11/1999 | Johnson et al. | ................. 96/135 |
| 6,402,811 | B1 | * | 6/2002 | Shanks et al. | ................... 95/90 |
| 6,454,827 | B2 | * | 9/2002 | Takagaki et al. | .............. 55/492 |
| 6,703,072 | B2 | * | 3/2004 | Fu et al. | ...................... 427/201 |
| 2002/0129711 | A1 | * | 9/2002 | Oda et al. | ...................... 96/134 |
| 2003/0116021 | A1 | * | 6/2003 | Oda et al. | ...................... 96/134 |

FOREIGN PATENT DOCUMENTS

| JP | 2002-011311 | 1/2002 |
|---|---|---|
| JP | 2002-115158 | 4/2002 |
| JP | 2002-266713 | 9/2002 |
| JP | 2003-042017 | 2/2003 |

* cited by examiner

*Primary Examiner*—Frank M Lawrence
(74) *Attorney, Agent, or Firm*—Patterson, Thuente, Skaar & Christensen, P.A.

(57) ABSTRACT

A fuel vapor adsorption filter includes a fuel vapor adsorption agent; a filter body containing the fuel vapor adsorption agent therein, and a frame formed to surround the filter body. The frame is adapted to be mounted within an intake air channel connected to an engine, so that the filter body is operable to adsorb a fuel vapor within the intake air channel when the engine has been stopped. Non-woven fabrics form the filter body. The non-woven fabrics have peripheral edge portions. Heat-pressing the peripheral edge portions of the non-woven fabrics forms the frame.

13 Claims, 7 Drawing Sheets

FUEL VAPOR ADSORPTION FILTERS

This application claims priority to Japanese patent application serial number 2004-182617, the contents of which are incorporated herein by reference.

BACKGROUND OF THE INVENTION

1. Field of the Invention

The present invention relates to fuel vapor adsorption filters, and in particular to fuel vapor adsorption filters that have a filter body and a frame surrounding the circumference of the filter body. The filter may be mounted within an intake air channel connected to an engine, e.g., an internal combustion engine, via the frame. The filter body may adsorb a fuel vapor within the intake air channel when the engine has stopped.

2. Description of the Related Art

Japanese Laid-Open Patent Publication No. 2003-42017 teaches a known fuel vapor adsorption filter. As shown in FIGS. 10(A), 10(B), and 10(C), a fuel vapor adsorption filter of this publication has a filter body 92 and a frame 94 surrounding the filter body 92. During the operation of an engine, the filter body 92 may permit intake air to pass through the filter body 92. When the engine has stopped, the filter body 92 may adsorb a fuel vapor within the intake air channel. The filter body includes an adsorption agent 92b made of activated carbon granules, a non-woven fabric 92c encasing and holding the adsorption agent 92b, and a net 92m made of resin and serving to protect the non-woven fabric 92c from any backfire flames produced by the engine. As shown in FIG. 10(A), injecting a resin into a mold 96, while an edge portion 92f of the filter body 92 is inserted into the mold 96, may produce the frame 94. In this way, the frame 94 is integrated with the filter body 92 at the same time that the frame 94 is molded. As shown in FIG. 10(C), a plurality of mounting holes 94h are formed in the frame 94 and are arranged in a circumferential direction. Pins 98p of an air cleaner housing 98 may be respectively inserted into the mounting holes 94h. The head portions of the pins 98p may then be heat-crimped, mounting the fuel vapor adsorption filter to the air cleaner housing 98.

However, in the case of the fuel vapor adsorption filter of the above publication, in order to mold the frame via an injection molding process, the edge portion 92f must be positioned between mating surfaces 96a and 96b of the mold 96. Therefore, the adsorption agent 92b made of activated carbon granules cannot be positioned at the edge portion 92f. This means that a range exists where no adsorption agent 92b is provided for a certain width inside of the frame 94 (i.e., the edge portion 92f of the filter body). As noted previously, the filter body 92 is primarily made of non-woven fabric 92c in order to permit the passage of intake air. Therefore, the edge portion 92f of the filter body 92 may permit the passage of air. However, this may result in the potential leakage of fuel vapor through the edge portion 92f.

In addition, because the frame 94 of the known filter is molded by an injection molding process, a different material than the material used for the filter body 92 is required for the frame 94. This may result in a problem of increased manufacturing costs.

SUMMARY OF THE INVENTION

It is accordingly an object of the present invention to teach fuel vapor adsorption filters that have improved fuel vapor adsorption performance and that can be manufactured at a relatively reduced cost.

In one aspect of the present teachings, fuel vapor adsorption filters are taught that include a fuel vapor adsorption agent; a filter body containing the fuel vapor adsorption agent therein, and a frame formed so as to surround the filter body. The frame is adapted to be mounted within an intake air channel connected to an engine so that the filter body is operable to adsorb fuel vapor within the intake air channel when the engine has been stopped. The filter body is formed by at least one first non-woven fabric. The first non-woven fabric has a peripheral edge portion. Heat-pressing the peripheral edge portion of the first non-woven fabric forms the frame.

Since the frame is formed by heat-pressing the peripheral edge portion(s) of the first non-woven fabric(s), it is possible to position the fuel vapor adsorption agent more proximally to the frame in comparison with a known frame that is molded by an injection molding process. Therefore, a peripheral region of the filter body within the frame where there is no fuel vapor adsorption agent may be reduced or minimized. As a result, the amount of fuel vapor that may potentially leak through such a peripheral region of the filter body can be minimized, improving the fuel vapor adsorption performance of the filter.

In addition, it is not necessary to use an additional material for forming the frame. Therefore, the manufacturing cost of the filter can be reduced.

In one embodiment, two first non-woven fabrics are disposed on opposite sides of the fuel vapor adsorption agent in order to form the filter body. The peripheral edge portions of the non-woven fabrics are then heat-pressed together to form the frame.

In another embodiment, the filter further includes at least one resin net for covering the filter body. The at least one resin net has a peripheral edge that is heat-pressed together with the peripheral edge portion of the first non-woven fabrics in order to form the frame. Since the peripheral portion of the resin net is additionally used to form the frame, the strength of the frame can be improved.

In a further embodiment, the filter body includes a holding layer for holding the fuel vapor adsorption agent and at least one cover layer for covering the holding layer. The first non-woven fabric forms the cover layer. The second non-woven fabric forms the holding layer. The peripheral edge portion of the first non-woven fabric of the cover layer extends outward beyond the second non-woven fabric forming the holding layer. The holding layer and the at least one cover layer are at least partly bonded or joined to each other by a bonding or joining means.

Since the holding layer and the at least one cover layer are at least partly bonded or joined to each other through a bonding or joining means, it is possible to prevent the cover layer from being peeled off or otherwise removed from the holding layer. Therefore, it is possible to prevent the adsorption agent, such as activated carbon granules, from being worn or broken by the flapping or movement of the cover layer.

In a further embodiment, the first non-woven fabric forming the cover layer includes fibers made of a first resin. The second non-woven fabric forming the holding layer includes fibers made of a second resin. The first resin has a higher melting point than the melting point of the second resin.

In a further embodiment, the average diameter of the fibers of the first non-woven fabric is larger than an average diameter of the fibers of the second non-woven fabric.

In another aspect of the present teachings, methods of manufacturing fuel vapor adsorption filters are taught. The methods may include steps of forming two sheets of the first non-woven fabrics; positioning the fuel vapor adsorption agent between the first non-woven fabrics; and heat-pressing the peripheral edge portions of the first non-woven fabrics together to form the frame.

DETAILED DESCRIPTION OF THE INVENTION

Each of the additional features and teachings disclosed above and below may be utilized separately or in conjunction with other features and teachings to provide improved fuel vapor adsorption filters and methods of manufacturing such adsorption filters. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

FIRST REPRESENTATIVE EMBODIMENT

Figure 3:
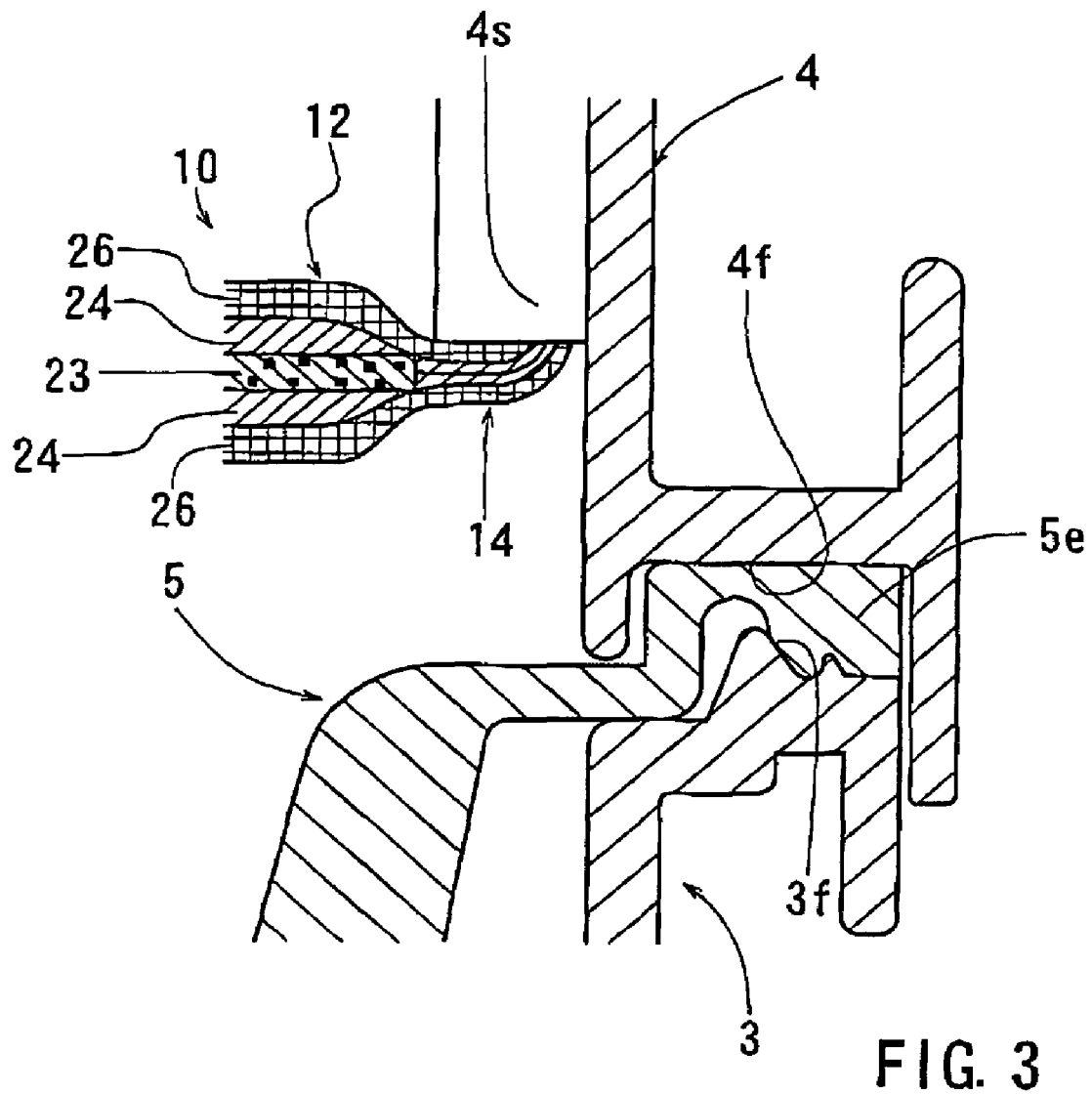
FIG. 3 is an enlarged cross-sectional view of a region indicated by an arrow III in FIG. 4 and showing a mounting structure of the filter to an air cleaner.
Figure 4:
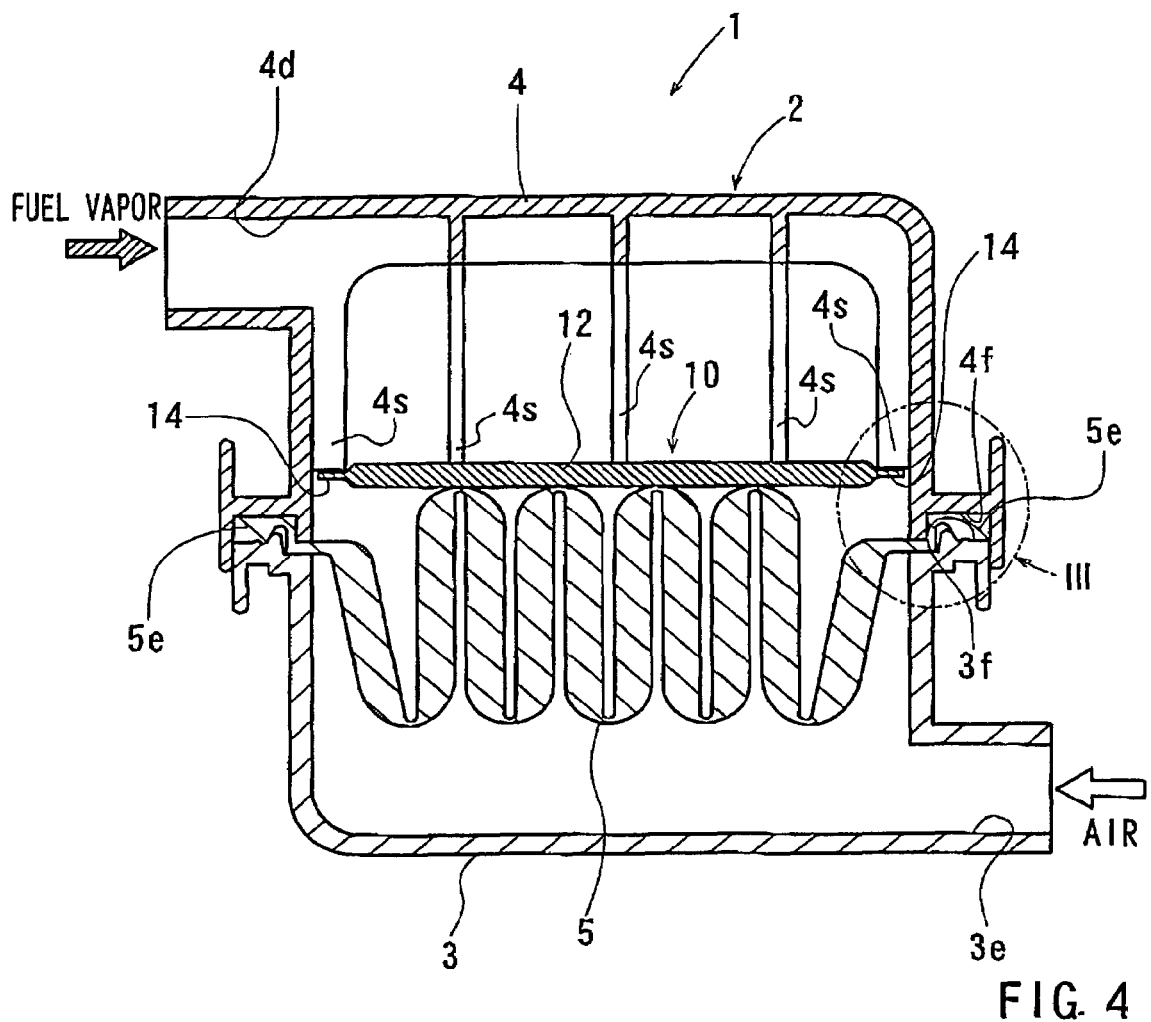
FIG. 4 is a vertical sectional view of the air cleaner incorporating the representative filter.
Figure 5:
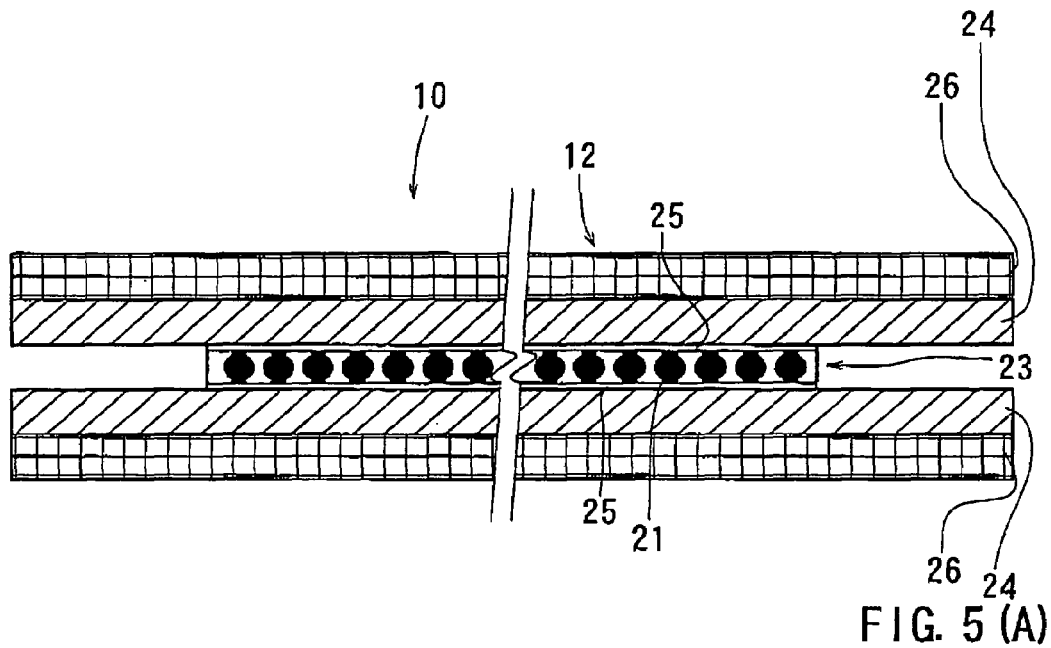
FIGS. 5(A) and 5(B) are vertical cross-sectional views showing modifications of the first representative embodiment.
Figure 5:
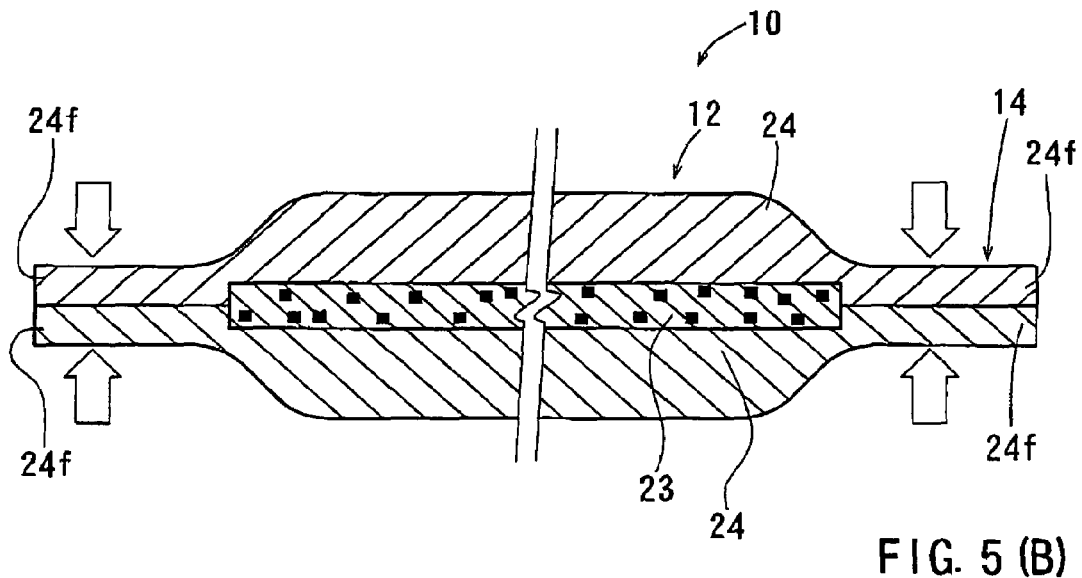

A first representative embodiment of the present invention will now be described with reference to FIGS. 1 to 5. Referring to FIG. 4, an air cleaner 1 is shown that includes a fuel vapor adsorption filter 10.

The air cleaner 1 has a housing 2 that is molded from a synthetic resin. The housing 2 includes a lower housing 3 and an upper housing 4 that respectively have an inlet port 3e and an outlet port 4d. The upper side of the lower housing 3 and the lower side of the upper housing 4 are open. An air cleaner element 5 has an outer peripheral frame 5e that is clamped between an open edge 3f of the lower housing 3 and an open edge 4f of the upper housing 4 as shown in FIG. 3. With this arrangement, the air cleaner element 5 is fixed in position so as to extend across the space within the housing 2 in order to filter intake air that is supplied to an engine (not shown).

The fuel vapor adsorption filter 10 is mounted within the housing 2 and is disposed on the downstream side (i.e., the upper side as viewed in FIG. 4) of the air cleaner element 5 so as to extend across the space within the housing 2. The fuel vapor adsorption filter 10 permits passage of intake air during the operation of the engine. However, when the engine has stopped, the fuel vapor adsorption filter 10 adsorbs the fuel vapor contained within the intake air flowing through the intake air channel in order prevent the potential leakage of fuel vapor to the outside environment. In this representative embodiment, the housing 2 constitutes a part of the intake air channel. The fuel vapor adsorption filter 10 includes a filter body 12 and a frame 14 disposed at the circumference of the filter body 12. The filter body 12 permits passage of intake air during the operation of the engine but adsorbs the fuel vapor contained within the intake air flowing through the intake air channel when the engine has stopped. The frame 14 may be secured to support portions 4s formed on an inner wall of the upper housing 4, mounting the fuel vapor adsorption filter 10 within the housing 2. The support portions 4s are positioned to be substantially equally spaced from each other along the open edge 4f of the upper housing 4.

As shown in FIGS. 1(A) and 1(B), the filter body 12 includes activated carbon granules 21 serving as a fuel vapor adsorption material, a holding layer 23 for holding the activated carbon granules 21, cover layers 24 for covering the holding layer 23, and nets 26 for covering the covering layers 24. FIGS. 1(A) and 1(B) respectively show the state where the frame 14 has not yet been molded and the state where the frame 14 has been molded.

The holding layer 23 is made of a non-woven fabric 23f that is formed from thermoplastic resin fibers and serves to contain and hold the activated carbon granules 21.

A representative apparatus and a representative method of manufacturing the non-woven fabric 23f forming the holding layer 23 will now be described with reference to FIGS. 2(A) and 2(B).

Referring to FIG. 2(A), a non-woven fabric manufacturing apparatus 40 for forming the non-woven fabric 23f has a conveyor 41 extending in a substantially horizontal direction. A fiber-forming nozzle 44 is located above the conveyor 41 and is oriented downward in the direction of the conveyor 41. For example, the fiber-forming nozzle 44 may be a nozzle that utilizes a melt-blown technique. Thus, a molten resin may be ejected from a central resin injection hole 44b of the fiber-forming nozzle 44. Hot air blowing holes 44a are formed around the central resin injection hole 44b and blow hot air towards the molten resin ejected from the central resin injection hole 44b, forming resin fibers F. An activated carbon supply device 50 is disposed on the upstream side (i.e., the left side as viewed in FIG. 2(A)) of the fiber-forming nozzle 44. The activated carbon supply device 50 serves to supply the activate carbon granules 21 to the formed resin fibers F by utilizing the force of gravity. The activated carbon granules 21 contact with the flow of the formed resin fibers F while the resin fibers F are still in a semi-melted state (i.e., incompletely solidified state).

Since the activated carbon granules 21 supplied from the activated carbon supply device 50 fall into the flow of the semi-melted resin fibers F during the forming process, the activated carbon granules 21 contact with the semi-melted resin fibers F and are contained within and among the resin fibers F. The resin fibers F containing the activate carbon granules 21 then fall onto the conveyer 41. Therefore, by moving the conveyer 41 at a relatively constant speed, the holding layer 23 with non-woven fabric 23f containing uniformly distributed activated carbon granules 21 (see FIG. 2(B)) is formed having a substantially uniform thickness on the conveyer 41.

Figure 1:
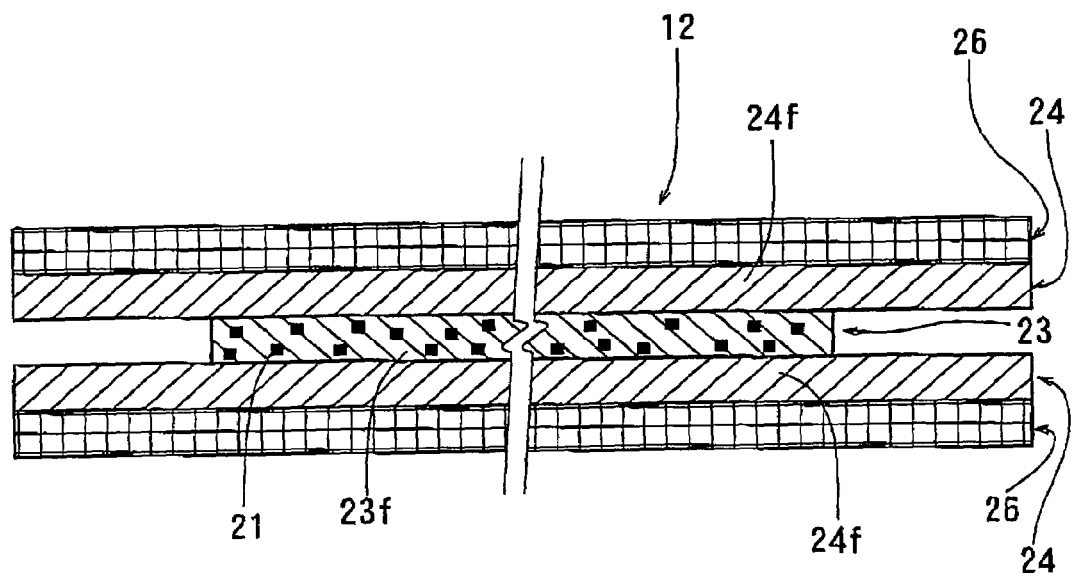
FIGS. 1(A) and 1(B) are a schematic vertical sectional views of a filter according to a first representative embodiment and respectively show the state before a frame is formed and the state after the frame has been formed.
Figure 1:
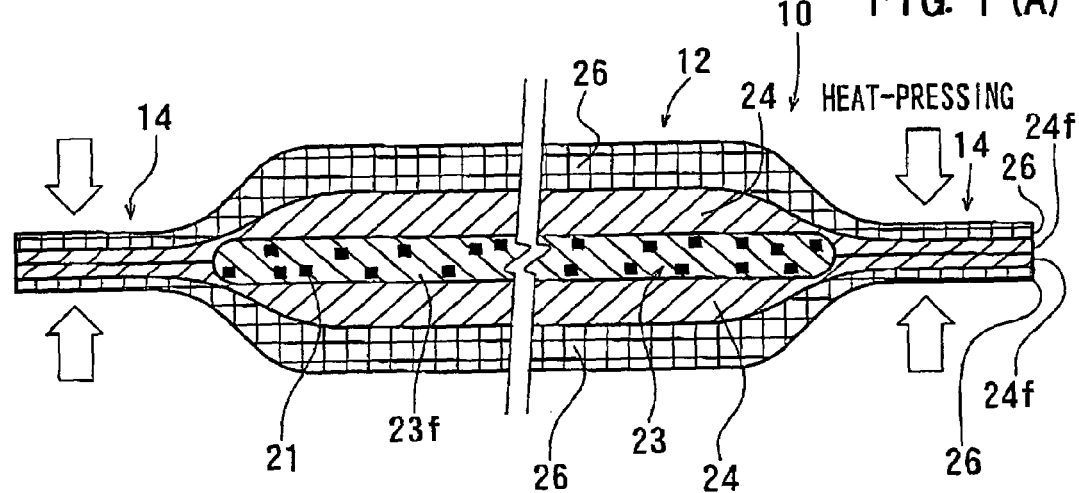
Figure 2:
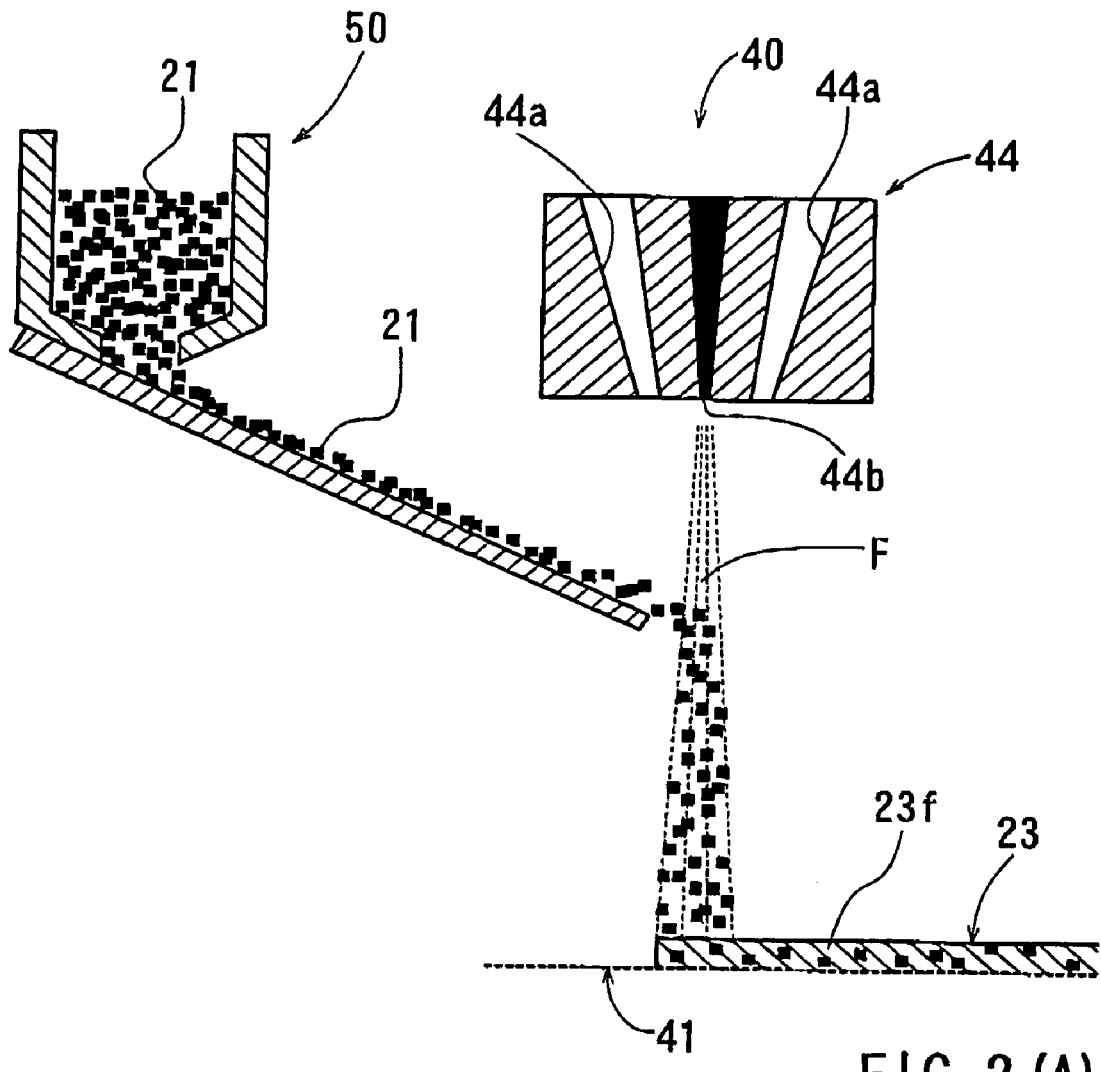
FIG. 2(A) is a schematic view showing a representative method or apparatus for manufacturing a holding layer of the filter.
FIG. 2(B) is a schematic vertical sectional view of a holding layer shown in FIG. 2(A)
Figure 2:
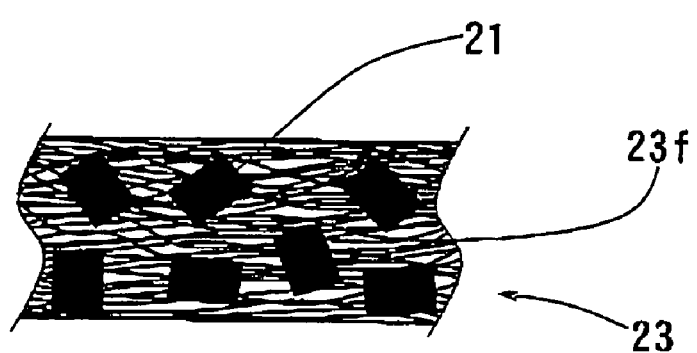

As shown in FIG. 1, the holding layer 23 is interleaved between cover layers 24 placed on opposite sides of the holding layer 23. The cover layers 24 are also made of non-woven fabric 24f formed of thermoplastic resin fibers. The cover layers 24 serve to help retain the activated carbon granules 21 that may be removed or dropped from the holding layer 23. The non-woven fabric 24f has a coarser mesh than the mesh of the non-woven fabrics 23f of the cover layers 24. The coarser mesh allows the permeability of air during the operation of the engine. In addition, the diameter of the resin fibers of the non-woven fabric 24f is chosen to be greater than the diameter of the resin fibers of the non-woven fabric 23f, in order to prevent the fibers of the non-woven fabric 24f from being melted and broken by engine backfire flames. In this specification, the term "diameter of resin fibers" is used to mean an average diameter of the resin fibers, unless otherwise noted. A non-woven fabric manufacturing apparatus may form the cover layers 24. The non-woven fabric manufacturing apparatus for the cover layers 24 may have the same general construction as the non-woven fabric manufacturing apparatus 40. The formed fibers may be laid below or above the formed fibers of the holding layer 23 in order to form the cover layers 24. Preferably, the fibers of the non-woven fabric 23f of the holding layer 23 and the fibers of the non-woven fabrics 24f of the cover layers 24f may be made of polybutylene terephthalate (PBT) or the like.

The nets 26 respectively covering the cover layers 24 may also be formed by resin fibers made of thermoplastic resin. The nets 26 serve to protect the non-woven fabric 23f of the holding layer 23 and the non-woven fabrics 24f of the cover layers 24 against engine backfire flames. To this end, the resin fibers of the nets 26 are chosen to have an even larger diameter than the diameter of the resin fibers of the non-woven fabric 24f of the cover layers 24. In addition, the nets 26 may have a coarser mesh than the mesh of the non-woven fabric 24f. Preferably, the resin fibers of the nets 26 may be made of resin having a high melting point, such as polypropylene, and the weight per unit area of each net 26 may be about 450 g/m$^2$ (i.e., about 900 g/m$^2$ for a combination of the nets 26 on both sides).

As shown in FIG. 1(A), in the state before the frame 14 is molded, the cover layers 24 and the nets 26 are positioned to extend by a predetermined distance radially outward beyond the peripheral edge of the holding layer 23. In other words, the holding layer 23 is positioned radially inward of the peripheral edges of the cover layers 24 and the nets 26. The peripheral edges of the cover layers 24 and the nets 26 are then heated and pressed together (i.e., heat-pressed), so that the non-woven fabrics 24f of the cover layers 24 and the nets 26 are partly melted and pressed together at their peripheral edges, forming a frame 14 having a flat plate-shaped configuration.

Here, when each net 26, made of polypropylene and having a weight per unit area of about 450 g/m2, has been heat-pressed, a plate having a thickness of about 1 mm may be formed substantially without voids. Even if the weight per unit area of each net 26 has been reduced to some extent, the frame 14 may be formed substantially without voids because the non-woven fabrics 24f of the cover layers 24 are heat-pressed together with the nets 26. Optionally, a reinforcing material, such as glass fibers, may be disposed at the peripheral edges of the cover layers 24 and/or the nets 26 so as to be contained within the formed frame 14, improving the strength of the frame 14. In this way, the portions of the holding layer 23 and the cover layers 24, other than the peripheral edges, may serve as adsorption agent holding portions.

Referring to FIG. 3, the frame 14 of the fuel vapor adsorption filter 10 is secured to the support portions 4s of the upper housing 4 by using an ultrasonic welding technique, fixing the filter 10 in position within the upper housing 4. For example, a vibrational welding technique, a laser welding technique, or an impulse welding technique, may also be used in place of the ultrasonic welding technique. Otherwise, the frame 14 may be bonded to the support portions 4s by using an adhesive agent or fastening device if it is difficult to apply a welding technique. Further, the support portions 4s may be replaced with a single support portion extending throughout the circumference of the upper housing 4 so that the entire circumference of the frame 14 of the filter 10 may be welded or bonded to the support portion.

As described above, according to the fuel vapor adsorption filter 10 of this representative embodiment, the frame 14 is formed to have a plate-shaped configuration by heating and pressing together the peripheral edges of the non-woven fabrics 24f, where no activated carbon granules exist. By using a heat-pressing technique, it is possible to position the activated carbon granules 21 more proximally (i.e., closer) to the frame 14 in comparison with a known frame formed via an injection molding process. Therefore, in comparison with the case of the known frame, it is possible to minimize the range inside of the frame where no activated carbon granules exist (i.e., typically the peripheral edge of the filter body 12). As a result, it is possible to reduce or minimize the amount of fuel vapor that may leak through the range where no activated carbon granules exist, improving the performance of the filter 10 with regard to adsorbing fuel vapor.

In addition, since heat-pressing together the peripheral edges of the non-woven fabrics 24f forms the frame 14, no additional material is required for forming the frame 14. Therefore, the manufacturing cost of the fuel vapor adsorption filter 10 can be reduced.

Further, the cover layers 24 for covering the holding layer 23 are covered with resin nets 26 in order to protect the non-woven fabrics 23f and 24f. The peripheral edge portions of the nets 26 may also be heated and pressed together with the non-woven fabrics 24 of the cover layers 24 in order to form the frame 14. Therefore, the strength of the frame 14 may be improved in comparison with a frame-shaped portion that is formed by only heat-pressing the non-woven fabrics 24f of the cover layers 24.

SECOND REPRESENTATIVE EMBODIMENT

A second representative embodiment will now be described in connection with FIGS. 6 to 9. This representative embodiment is a modification of the first representative embodiment. Therefore, like members are given the same reference numerals as in the first representative embodiment and the description of these members may not be repeated.

As described above, according to the first representative embodiment, the cover layers 24 of the fuel vapor adsorption filter 10 are formed by laying the formed resin fibers of the non-woven fabric 24f, which are formed by the non-woven fabric manufacturing apparatus that has the same construction as the non-woven fabric manufacturing apparatus 40, above and below the non-woven fabric 23*f* of the holding layer 23. Therefore, the resin fibers F of the holding layer 23 and the resin fibers of the cover layers 24 may be naturally bonded to each other during the overlaying process. However, in case of relatively small boding forces between the resin fibers F of the holding layer 23 and the resin fibers of the cover layers 24, during a long period of use the cover layers 24 may be potentially peeled off or separated from the holding layer 23. When this occurs, the cover layers 24 may flap or move relative to the holding layer 23, causing the activated carbon granules 21 of the holding layer 23 to become worn or broken. A fine powder of activated carbon may be produced and this powder may be dropped off or removed from the filter 10. In view of this problem, a fuel vapor adsorption filter 60 of the second representative embodiment is configured to prevent the cover layers 24 from being peeled away from the holding layer 23, or at least the fuel vapor adsorption filter 60 is configured to minimize the possibility that the cover layers 24 are peeled away from the holding layer 23.

Figure 6:
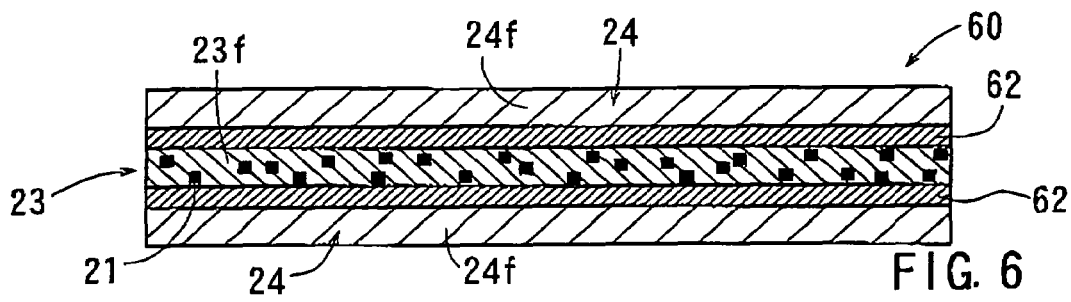
FIG. 6 is a vertical cross-sectional view of a vapor adsorption filter according to a second representative embodiment.

As shown in FIG. 6, the fuel vapor adsorption filter 60 has adhesive sheets 62 respectively interleaved between the holding layer 23 and the cover layers 24. The adhesive sheets 62 are resin sheets having a relatively low melting point. Therefore, when the adhesive sheets 62 have been heated to a predetermined temperature, the melted resin of the adhesive sheets 62 may permeate into the non-woven fabric 23*f* of the holding layer 23 and the non-woven fabrics 24*f* of the cover layers 24. The holding layer 23 and the non-woven fabrics 24 can be bonded together when the permeated resin has solidified. However, in view of permeability of air, the adhesive sheets 62 may preferably be only disposed at the minimum number of areas necessary or required to form a bond.

Figure 7:
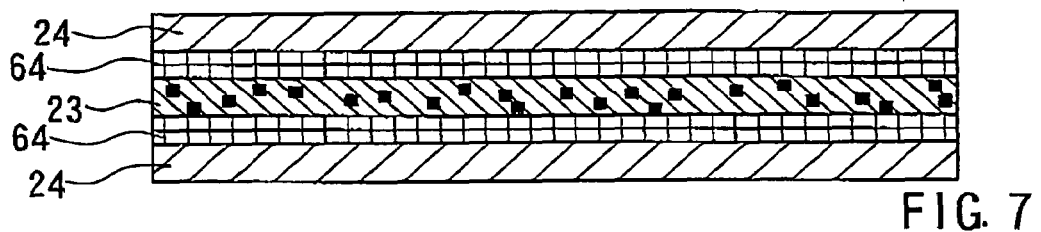
FIGS. 7, 8, and 9 are vertical cross-sectional views showing modifications of the second representative embodiment.
Figure 8:
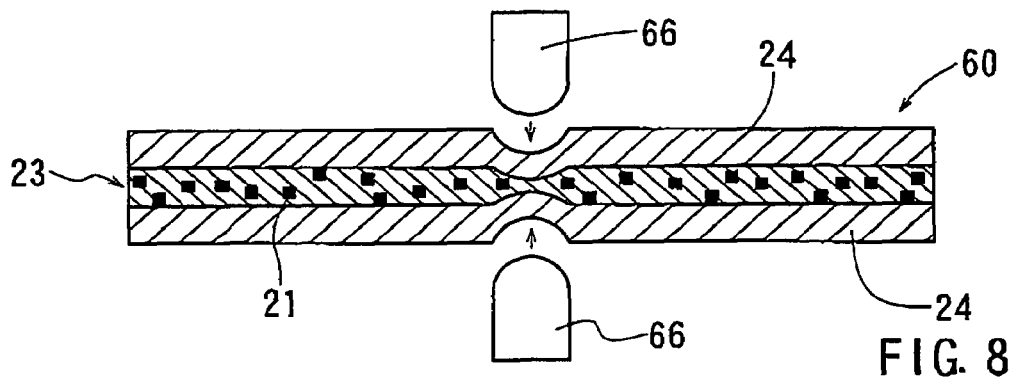

Alternatively, as shown in FIG. 7, adhesive nets 64 may be respectively interleaved between the holding layer 23 and the cover layers 24. For example, the adhesive nets 64 may be made of glass fibers coated with resin. Liquid adhesive agent may then be coated on the resin-coated surfaces of the glass fibers. Therefore, the interleaved adhesive nets 64 may bond the cover layers 24 to the holding layer 23 via the liquid adhesive agents of the adhesive nets 64. The use of the adhesive nets 64 advantageously minimizes the loss of air pressure, which may otherwise occur when intake air passes through the filter 10.

Figure 9:
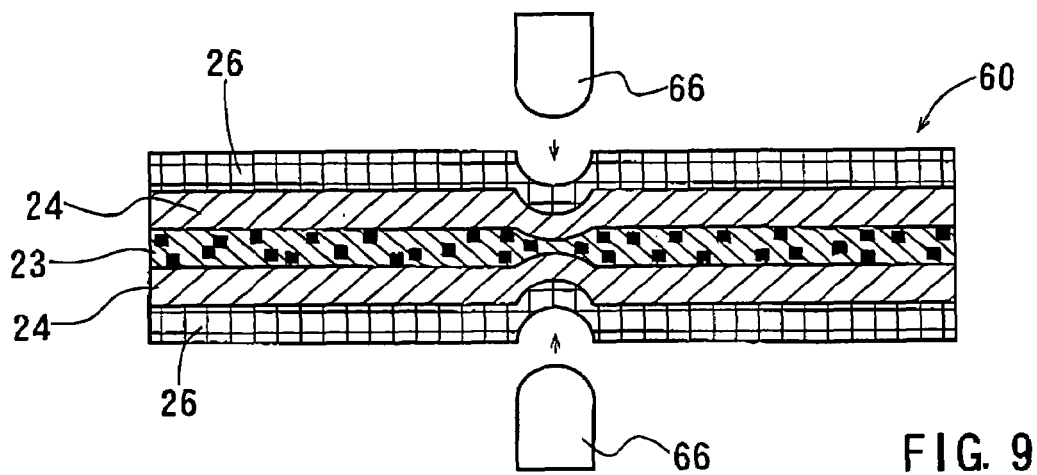
Figure 10:
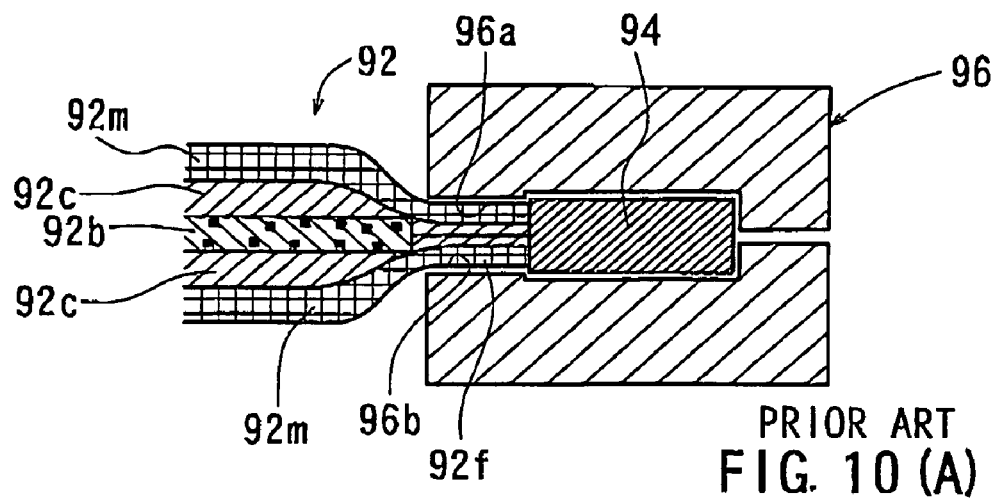
FIG. 10(A) is a schematic vertical sectional view showing a method of manufacturing a known fuel vapor adsorption filter.
FIG. 10(B) is a schematic vertical sectional view of the known filter.
FIG. 10(C) is a schematic view showing the mounting structure of the known filter to an air cleaner.
Figure 10:
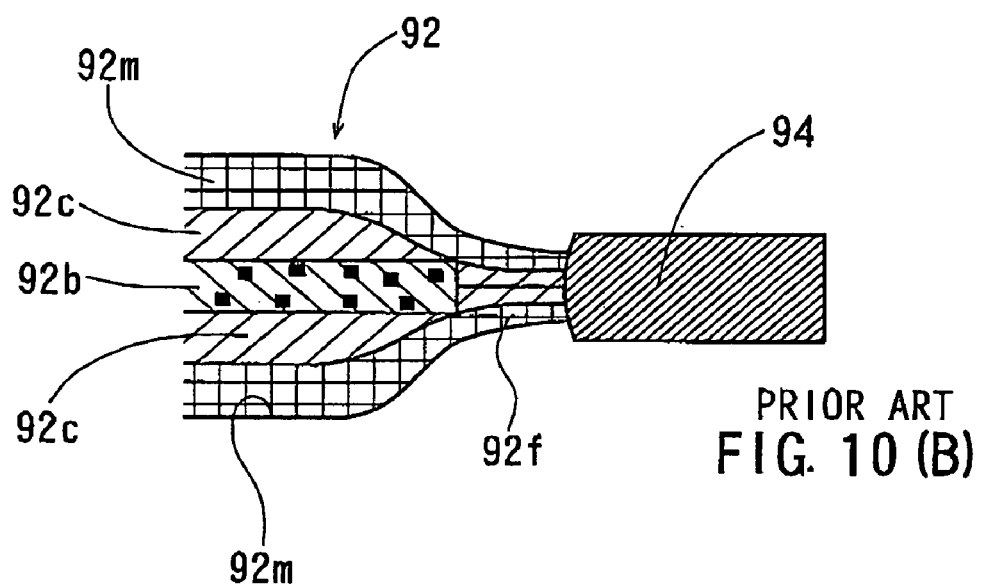
Figure 10:
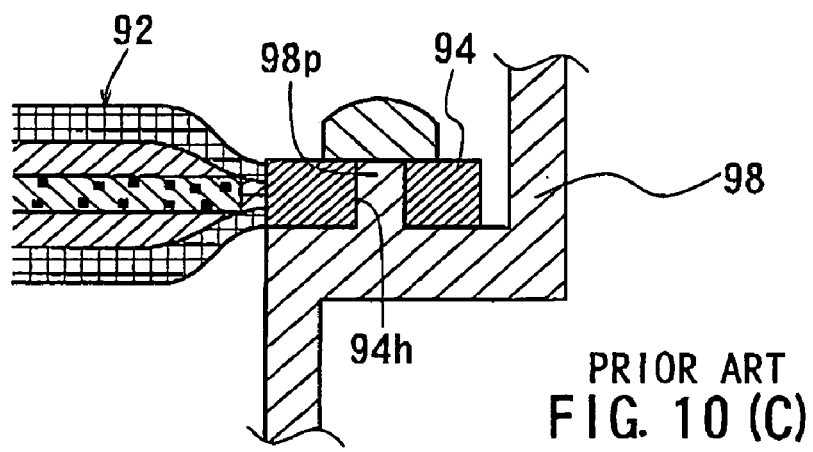

Even further alternatively, a pair of heated pins 66 may be moved to clamp and press together the holding layer 23 and the cover layers 24 from opposite sides of the filter 60. The non-woven fabric 23*f* of the holding layer 23 and the non-woven fabrics 24*f* of the cover layers 24 may consequently be partially melted and bonded together. As a result, the heated pins 66 may serve as a partial heat press. In this way, by partially heating and bonding the non-woven fabrics 23*f* and 24*f* together by using the heated pins 66, it is possible to bond the non-woven fabrics 23*f* and 24*f* together and also to bond the non-woven fabrics 24*f* and the corresponding resin nets 26 together, even after the cover layers 24 have been covered with the resin nets 26, as shown in FIG. 9.

Still further alternatively, it is possible to join together the holding layer 23 and the cover layers 24 by partially sewing these layers together. In addition, the non-woven fabric 23*f* of the holding layer 23 and the non-woven fabrics 24*f* of the cover layers 24 may be partially joined together by using a needle punching technique for entangling the fibers of the non-woven fabrics 23*f* and 24*f* together. Also, the non-woven fabric 23*f* of the holding layer 23 and the non-woven fabrics 24*f* of the cover layers 24 may be joined together by using liquid adhesive agents that may be applied so as to permeate throughout the thickness of the filter 60, partially joining together the non-woven fabrics 23*f* and 24*f*.

In this way, joining or bonding means including the adhesive sheets 62, the adhesive nets 64, the heated pins 66, as well as other various joining or bonding means described above, may be used for at least partially bonding the holding layer 23 and the cover layers 24 to each other and/or for at least partially bonding the cover layers 24 to the resin nets 26.

As described above, according to the second representative embodiment, the holding layer 23 containing and holding the activated carbon granules 21, and the cover layers 24 for covering the holding layer 23 are bonded or joined together by the joining or bonding means (including the adhesive sheets 62, etc.) at positions within a region corresponding to the filter body 12. Therefore, the cover layers 24 may be prevented from being peeled off from the holding layer 23 or the possibility that the cover layers 24 are peeled off from the holding layer 23 may be minimized. As a result, the activated carbon granules 21 of the holding layer 23 may not be worn or broken the cover layers 24 by the flapping or movement of the cover layers 24 relative to the holding layer 23.

OTHER POSSIBLE EMBODIMENTS

The present invention may not be limited to the first and second representative embodiments but may be modified in various ways.

In the above representative embodiments, the holding layer 23 is formed so as to contain the activated carbon granules 21 by dropping the activated carbon granules 21 into the flow of the resin fibers F during the process of forming the fiber F by the fiber-forming nozzle 44*b*. However, the holding layer 23 may be formed, for example, by bonding the activated carbon granules 21 to nets 25 by an adhesive agent, so that the activated carbon granules 21 are distributed within a plane as shown in FIG. 5(A). The nets 25 may be made of glass fibers coated with resin.

Although the cover layers 24 are covered with the nets 26 in the above representative embodiments, the nets 26 may be eliminated as shown in FIG. 5(B) by appropriately determining the diameter and/or the weight per unit area and/or by appropriately selecting the material of the fibers of the non-woven fabric 24*f* forming each cover layer 24 so as to prevent the fibers from being melted and broken by engine backfire flames.

Although the activated carbon granules 21 are used as a vapor adsorption agent in the above representative embodiments, the activated carbon granules 21 may be replaced with activated carbon fibers or any other material capable of adsorbing fuel vapor.

In the above representative embodiments, the fibers of the non-woven fabric 23*f* of the holding layer 23 and the non-woven fabrics 24*f* of the cover layers 24 are made of polybutylene terephthalate (PBT) or the like, and the nets 26 are made of polypropylene (PP). However, the non-woven fabrics 24*f* of the cover layers 24 may also be made of polypropylene or the like.

The resin fibers forming the non-woven fabric 23*f* of the holding layer 23 and the resin fibers forming the non-woven fabrics 24*f* of the holding layers 24 may be made of resin (or resins) that may constrict when heated. Therefore, by cooling the holding layer 23 and the cover layers 24 of the filter body 12 after the frame 14 has been formed, the frame 14 may be strained towards the inside, preventing or minimizing potential undulation of the frame.

This invention claims:

1. A fuel vapor adsorption filter, comprising:
   a fuel vapor adsorption agent; and
   a filter body containing the fuel vapor adsorption agent therein; and
   a frame formed to surround the filter body, wherein the fame is arranged and constructed to be mounted within an intake air channel connected to an engine, so that the filter body is operable to adsorb a fuel vapor within the intake air channel when the engine has been stopped, wherein the filter body is formed by at least one first non-woven fabric; and wherein the first non-woven fabric has a peripheral edge portion; and wherein the frame is formed by heat-pressing the peripheral edge portion of the first non-woven fabric;

wherein the filter body comprises a holding layer for holding the fuel vapor adsorption agent and at least one cover layer for covering the holding layer; and wherein the cover layer is formed by the first non-woven fabric; and wherein the holding layer is formed by a second non-woven fabric; and wherein the peripheral edge portion of the first non-woven fabric of the cover layer extends outward of the second non-woven fabric forming the holding layer; and wherein the holding layer and the at least one cover layer are at least partially bonded or joined to each other by a bonding or joining means; and wherein the first non-woven fabric forming the cover layer comprises fibers made of a first resin; and wherein the second non-woven fabric forming the holding layer comprises fibers made of a second resin; and wherein the first resin has a higher melting point than a melting point of the second resin.

2. The fuel vapor adsorption filter as in claim 1, wherein the filter body is formed by two first non-woven fabrics disposed on opposite sides of the fuel vapor adsorption agent.

3. The fuel vapor adsorption filter as in claim 1, further comprising at least one resin net for covering the filter body, wherein the at least one resin net has a peripheral edge that is heat-pressed together with the peripheral edge portion of the first non-woven fabrics in order to form the frame.

4. The fuel vapor adsorption filter as in claim 1, wherein an average diameter of the fibers of the first non-woven fabric is larger than an average diameter of the fibers of the second non-woven fabric.

5. A fuel vapor adsorption filter, comprising:

a fuel vapor adsorption agent; and a filter body comprising first non-woven fabrics and containing the fuel vapor adsorption agent therein, wherein the first non-woven fabrics have peripheral edge portions; and a frame defining a circumference of the filter body and molded by heat-pressing the peripheral edge portions of the first non-woven fabrics together; and wherein the filter body further comprises a second non-woven fabric disposed between two first non-woven fabrics; and wherein the fuel vapor adsorption agent comprises activated carbon substantially uniformly distributed within the second non-woven fabric.

6. The fuel vapor adsorption filter as in claim 5, wherein the first non-woven fabrics comprise resin fibers made of polybutylene terephthalate (PBT).

7. The fuel vapor adsorption filter as in claim 5, wherein the first non-woven fabrics and the second non-woven fabric are at least partially bonded or joined to each other.

8. The fuel vapor adsorption filter as in claim 5, further comprises resin nets having peripheral edge portions and covering the filter body from opposite sides with respect to a flow direction of intake air; and wherein the peripheral edge portions of the resin nets are heat-pressed together with the peripheral edge portions of the first non-woven fabrics to form the frame.

9. The fuel vapor adsorption filter as in claim 8, wherein the resin nets comprise resin fibers made of polypropylene.

10. A method of manufacturing the fuel vapor adsorption filter as in claim 5, comprising:

forming two sheets of the first non-woven fabrics; and positioning the fuel vapor adsorption agent between the first non-woven fabrics; and heat-pressing the peripheral edge portions of the first non-woven fabrics together to form the frame; and forming a second non-woven fabric and distributing the fuel vapor adsorption agent within the second non-woven fabric, so that the second non-woven fabric contains the fuel vapor adsorption agent; and wherein the step of positioning the fuel vapor adsorption agent comprises interleaving the second non-woven fabric between the first non-woven fabrics.

11. The method as in claim 10, further comprising:

at least partially bonding or joining the first non-woven fabrics together with the second non-woven fabric.

12. The method as in claim 10, further comprising:

covering the first non-woven fabrics with resin nets, wherein the resin nets have peripheral edge portions; and wherein the peripheral edge portions of the resin nets are heat-pressed together with the peripheral edge portions of the first non-woven fabrics to form the frame.

13. A fuel vapor adsorption filter, comprising:

a fuel vapor adsorption agent; and a filter body containing the fuel vapor adsorption agent therein; and a frame formed to surround the filter body, wherein the fame is arranged and constructed to be mounted within an intake air channel connected to an engine, so that the filter body is operable to adsorb a fuel vapor within the intake air channel when the engine has been stopped, wherein the filter body is formed by at least one first non-woven fabric; and wherein the first non-woven fabric has a peripheral edge portion; and wherein the frame is formed by heat-pressing the peripheral edge portion of the first non-woven fabric;

wherein the filter body comprises a holding layer for holding the fuel vapor adsorption agent and at least one cover layer for covering the holding layer; and wherein the cover layer is formed by the first non-woven fabric; and wherein the holding layer is formed by a second non-woven fabric; and wherein the peripheral edge portion of the first non-woven fabric of the cover layer extends outward of the second non-woven fabric forming the holding layer; and wherein the holding layer and the at least one cover layer are at least partially bonded or joined to each other by a bonding or joining means; and wherein the first non-woven fabric forming the cover layer and the second non-woven fabric forming the holding layer are made of the same material.

* * * * *